United States Patent
Kitazawa

(10) Patent No.: US 11,782,015 B2
(45) Date of Patent: Oct. 10, 2023

(54) ELECTROCHEMICAL OXYGEN SENSOR

(71) Applicant: Maxwell, Ltd., Kyoto (JP)

(72) Inventor: Naohisa Kitazawa, Kyoto (JP)

(73) Assignee: Maxell, Ltd., Kyoto (JP)

( * ) Notice: Subject to any disclaimer, the term of this patent is extended or adjusted under 35 U.S.C. 154(b) by 330 days.

(21) Appl. No.: 17/273,539

(22) PCT Filed: Jan. 21, 2020

(86) PCT No.: PCT/JP2020/001840
§ 371 (c)(1),
(2) Date: Mar. 4, 2021

(87) PCT Pub. No.: WO2021/149134
PCT Pub. Date: Jul. 29, 2021

(65) Prior Publication Data
US 2022/0113275 A1    Apr. 14, 2022

(51) Int. Cl.
*G01N 27/404* (2006.01)
*G01N 27/416* (2006.01)

(52) U.S. Cl.
CPC ......... *G01N 27/404* (2013.01); *G01N 27/416* (2013.01)

(58) Field of Classification Search
CPC ........................... G01N 27/404; G01N 27/416
See application file for complete search history.

(56) References Cited

U.S. PATENT DOCUMENTS

| 2007/0272553 A1 | 11/2007 | Gambert |
| 2010/0252432 A1 | 10/2010 | Kitazawa |
| 2014/0090977 A1 | 4/2014 | Boardman |

(Continued)

FOREIGN PATENT DOCUMENTS

| EP | 2219024 A1 | 8/2010 |
| EP | 3495810 A1 | 6/2019 |
| EP | 3832297 A1 | 6/2021 |

(Continued)

OTHER PUBLICATIONS

Citric Acid Compound Summary on the NIH-National Library of Medicine website PubChem https://pubchem.ncbi.nlm.nih.gov/compound/citric_acid; downloaded Mar. 25, 2023 (Year: 2023).*

(Continued)

*Primary Examiner* — Alexander S Noguerola
(74) *Attorney, Agent, or Firm* — WHDA, LLP

(57) ABSTRACT

An electrochemical oxygen sensor with a long service life is provided. The electrochemical oxygen sensor according to the present invention includes a positive electrode, a negative electrode, and an electrolyte solution, and the negative electrode contains tin or a tin alloy, the electrolyte solution is an aqueous solution obtained by dissolving at least citric acids, the aqueous solution contains an alkali metal, a total content of the citric acids in the electrolyte solution is 2.1 mol/L or higher, a content of the alkali metal in the electrolyte solution is 0.1 to 1.6 times the total content of the citric acids, the electrolyte solution has a pH of 3.9 to 4.6, and when a volume of the electrolyte solution is x (ml) and a content of tin contained in the negative electrode is y (g), $x/y \geq 0.3$ (ml/g) holds true.

12 Claims, 1 Drawing Sheet

(56) References Cited

U.S. PATENT DOCUMENTS

| | | |
|---|---|---|
| 2019/0219535 A1 | 7/2019 | Kitazawa |
| 2021/0255135 A1 | 8/2021 | Kitazawa et al. |

FOREIGN PATENT DOCUMENTS

| | | | |
|---|---|---|---|
| JP | 2008-101948 A | 5/2008 | |
| JP | 2015-505358 A | 2/2015 | |
| JP | 2018-109549 A | 7/2018 | |
| JP | 2019-066328 A | 4/2019 | |
| JP | 2019-066331 A | 4/2019 | |
| JP | 2019-066332 A | 4/2019 | |
| WO | 2009/069749 A1 | 6/2009 | |
| WO | 2013049752 A1 | 4/2013 | |
| WO | WO 2018124066 A1 * | 7/2018 | ........... G01N 27/404 |
| WO | 2020/079769 A1 | 4/2020 | |

OTHER PUBLICATIONS

Bereket et al., "Corrosion Potential of Tin Electrodes in Citric Acid, Malic Acid, and Glutamic Acid," Commun. Fac. Sci. Univ. Ank. Series B V. 37. pp. 81-94 (1991) (Year: 1991).*

Calderon et al., "Effect of Citrate Ion Behavior Electrochemistry of Tin and Steel," Rev. Colomb. Quim., 2007, 36(3): 349-360 with a Google translator machine-generated English language translation attached, translation Mar. 25, 2023. (Year: 2007).*

Written Opinion dated Mar. 24, 2020, issued in counterpart application No. PCT/JP2020/001840 (English language version) (Year: 2020).*

The European Search Report dated Dec. 2, 2021, issued in counterpart EP Application No. 20855849.4. (4 pages).

Office Action dated Dec. 14, 2021, issued in counterpart EP Application No. 20855849.4. (7 pages).

International Search Report dated Mar. 24, 2020, issued in counterpart application No. PCT/JP2020/001840 (3 pages).

* cited by examiner

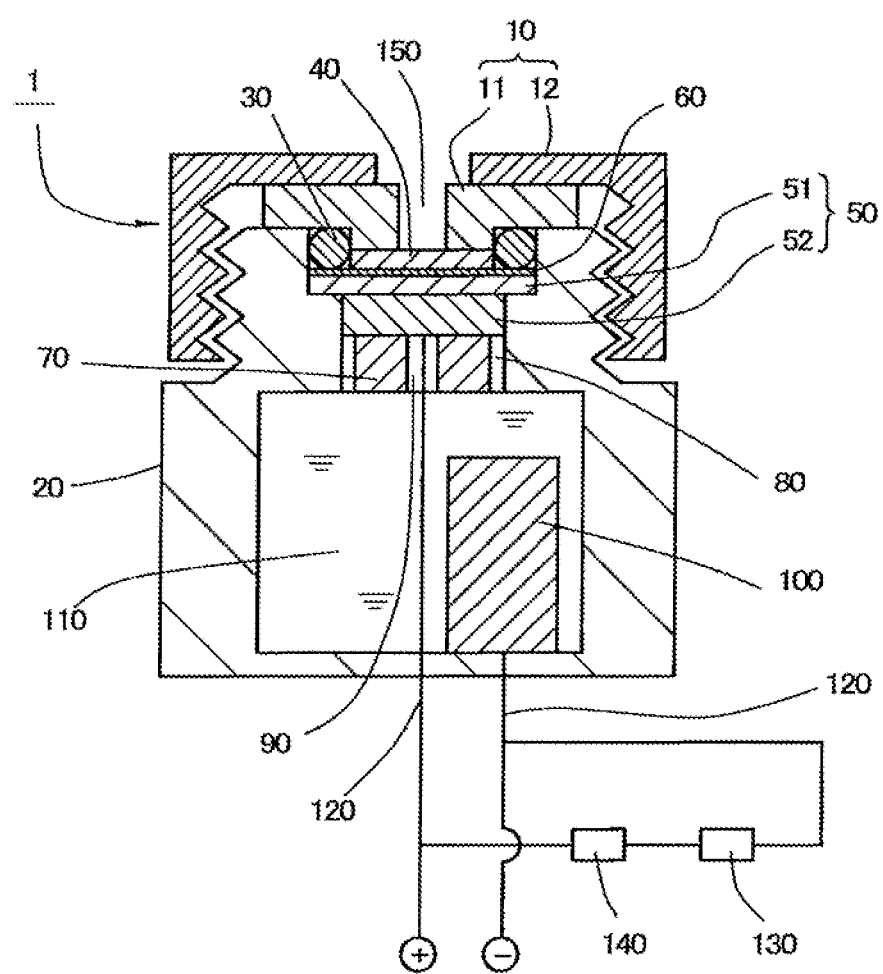

ELECTROCHEMICAL OXYGEN SENSOR

TECHNICAL FIELD

The present invention relates to an electrochemical oxygen sensor with a long service life.

BACKGROUND ART

Electrochemical oxygen sensors (also referred to as "oxygen sensors" hereinafter) are advantageous in that they are inexpensive and convenient and can be operated at room temperature. Thus, these oxygen sensors have been used widely in various fields for checking the degree of oxygen deficiency in holds of ships and in manholes and for detecting the oxygen concentration in medical equipment such as anesthesia apparatuses and respirators.

As such an electrochemical oxygen sensor, Patent Document 1 discloses an electrochemical oxygen sensor that includes a cathode, an anode, and an electrolyte solution, in which the electrolyte solution contains a chelating agent, and has a pH of 12 or more, for example.

Also, Patent Document 2 discloses that the service life of an oxygen sensor can be improved by setting a molar concentration of a chelating agent in an electrolyte solution of an electrochemical oxygen sensor to 1.4 mol/L or higher.

PRIOR ART DOCUMENTS

Patent Document

[Patent Document 1] WO 2009/069749
[Patent Document 2] JP 2018-109549A

DISCLOSURE OF INVENTION

Problem to be Solved by the Invention

However, the service lives of electrochemical oxygen sensors using negative electrodes without containing hazardous substances such as Pb have not yet been sufficiently improved, and in particular, it is needed to further study electrochemical oxygen sensors in which tin or a tin alloy is used as the negative electrodes.

The present invention was made in view of the above-described circumstances, and aims to provide an electrochemical oxygen sensor with a long service life.

Means for Solving Problem

An electrochemical oxygen sensor according to the present invention includes a positive electrode, a negative electrode, and an electrolyte solution, and the negative electrode contains tin or a tin alloy, the electrolyte solution is an aqueous solution obtained by dissolving at least citric acids, the aqueous solution contains an alkali metal, a total content of the citric acids in the electrolyte solution is 2.1 mol/L or higher, a content of the alkali metal in the electrolyte solution is 0.1 to 1.6 times the total content of the citric acids, the electrolyte solution has a pH of 3.9 to 4.6, and when a volume of the electrolyte solution is x (ml) and a content of tin contained in the negative electrode is y (g), $x/y \geq 0.3$ (ml/g) holds true.

Effects of the Invention

According to the present invention, it is possible to provide an electrochemical oxygen sensor with a long service life.

BRIEF DESCRIPTION OF DRAWINGS

FIG. 1 is a cross-sectional view schematically showing one example of an electrochemical oxygen sensor according to the present invention.

DESCRIPTION OF THE INVENTION

First, an electrochemical oxygen sensor according to the present invention is described with reference to the drawing, using, as an example, a galvanic cell type oxygen sensor, which is a suitable embodiment.

FIG. 1 is a cross-sectional view schematically showing a galvanic cell type oxygen sensor according to one embodiment of an electrochemical oxygen sensor.

An oxygen sensor 1 shown in FIG. 1 has a positive electrode 50, a negative electrode 100, and an electrolyte solution 110 in a tubular holder 20 having a bottom. A holder lid 10 having a through-hole 150 for taking oxygen into the oxygen sensor 1 is attached to an upper opening portion of the holder 20 via an O-ring 30, the holder lid 10 being constituted by a first holder lid (inner lid) 11 and a second holder lid (outer lid) 12 for fixing the first holder lid 11.

The negative electrode 100 is arranged in a tank in the holder 20 in a state in which the negative electrode 100 is immersed in the electrolyte solution, the tank storing the electrolyte solution 110. A lead wire 120 is attached to the negative electrode 100, and a correction resistor 130 and a temperature compensation thermistor 140 are connected in series to this lead wire 120 outside the holder 20. Also, the positive electrode 50 is composed by stacking a catalytic electrode 51 and a positive electrode current collector 52, and the lead wire 120 is also attached to the positive electrode current collector 52. Also, the positive electrode 50 is arranged above the electrolyte solution storage tank via a positive electrode current collector holding portion 70. Also, the positive electrode current collector holding portion 70 is provided with a bore 80 for supplying the electrolyte solution 110 stored in the electrolyte solution storage tank to the positive electrode 50, and a bore 90 to allow the passage of the lead wire 120 attached to the positive electrode current collector 52.

A barrier membrane 60, which selectively allows oxygen to pass therethrough and limits the amount of oxygen passing therethrough to match a cell reaction, is arranged on an upper portion of the positive electrode 50, and oxygen passing through the through-hole 150 provided in the holder lid 10 is introduced into the positive electrode 50 through the barrier membrane 60. Also, a protective film 40 for preventing dirt, dust, water, or the like from adhering to the barrier membrane 60 is arranged on an upper portion of the barrier membrane 60, and is fixed by the first holder lid 11.

That is, the first holder lid 11 functions as a pressing end plate for pressing the protective film 40, the barrier membrane 60, and the positive electrode 50. In the sensor 1 shown in FIG. 1, a threaded portion is formed on an inner circumferential portion of the second holder lid 12 to be screwed onto a threaded portion formed on an outer circumferential portion of the holder 20. Then, the first holder lid 11 is pressed against the holder 20 via the O-ring 30 by screwing the holder lid 10 on, and thus, the protective film 40, the barrier membrane 60, and the positive electrode 50 can be fixed to the holder 20 in such a state that airtightness and liquid tightness are maintained.

The operating principle of the galvanic cell type oxygen sensor having an electrolyte solution containing a chelating agent as described in Patent Document 1 is considered as follows, and is described with reference to FIG. 1.

Oxygen that has passed through the barrier membrane 60 and has entered the inside of the oxygen sensor 1 is reduced by the catalytic electrode 51 of the positive electrode 50, and causes the following electrochemical reaction with the negative electrode 100 via the electrolyte solution 110.

Positive electrode reaction: $O_2 + 4H^+ + 4e^- \rightarrow 2H_2O$

Negative electrode reaction: $Sn + 2H_2O \rightarrow SnO_2 + 4H^+ + 4e^-$ $Y^{X-} + SnO_2 + 4H^+ \rightarrow YSn^{4-x} + 2H_2O$ :Y represents a chelating agent (citric acid)

Note that although the negative electrode 100 can be composed of metals such as Cu, Fe, Ag, Ti, Al, Mg, Zn, Ni, and Sn, or alloys thereof for example, Sn or an Sn alloy is used because Sn or an Sn alloy are unlikely to corrode in an acidic electrolyte solution used in the present invention, and complies with the RoHS Directive on restriction of the use of certain hazardous substances in the EU (European Union) (Restriction of the Use of Certain Hazardous Substances in Electrical and Electronic Equipment). Therefore, the above-described electrochemical reaction equations represent a case where the negative electrode is composed of Sn or an Sn alloy.

A current corresponding to the oxygen concentration is generated between the catalytic electrode 51 and the negative electrode 100 through this electrochemical reaction. The current generated by the positive electrode reaction at the catalytic electrode 51 is collected by the positive electrode current collector 52 that is pressed against the catalytic electrode 51, is guided by the lead wire 120 to the outside, and flows to the negative electrode 100 through the correction resistor 130 and the temperature compensation thermistor 140. Accordingly, the current is converted into a voltage signal, and a voltage can be obtained as the output of the oxygen sensor. Then, the output voltage thus obtained is converted into an oxygen concentration using a known method, and is detected as the oxygen concentration.

Here, citric acid (Y), which is a chelating agent, is present as citrate ions in the electrolyte solution, and has an action of chelating the constituent metal of the negative electrode and dissolving the chelated metal in the electrolyte solution (referred to as "chelating action" hereinafter). However, the inventor of the present invention considered that, that the concentration of metal (Sn) derived from the negative electrode to dissolve in the electrolyte solution reaches the saturation concentration such that the above-described metal oxide is produced and the negative electrode becomes inactive is one of the causes of shortening the service life of an oxygen sensor.

In view of this, as a result of intensive studies, the inventor of the present invention found that the concentration of tin dissolved from the negative electrode in the electrolyte solution can be delayed from reaching the saturation concentration by increasing the molar concentration of citric acid (Y) in the electrolyte solution, and as a result, the service life of the oxygen sensor can be improved, thereby completing the present invention.

Citric acid used in the electrolyte solution of the electrochemical oxygen sensor according to the present invention has a plural number of functional groups that coordinate with metal ions, and forms a complex (complexation) with the metal ions, thereby inactivating the metal ions. Citric acid can be added to an electrolyte solution as citric acid or salt thereof (citric acid and salt of citric acid are collectively referred to as citric acids in this specification) in a solvent that constitutes the electrolyte solution.

In the oxygen sensor of the present invention, an aqueous solution in which at least citric acids can be dissolved is used as the electrolyte solution. Here, the above-described aqueous solution is prepared such that the aqueous solution contains an alkali metal, and the total content of the citric acids is 2.1 mol/L or higher, and the content of the alkali metal is 0.1 to 1.6 times the total content of the citric acids, and the aqueous solution has a pH of 3.9 to 4.6. Note that the solvent of the electrolyte solution is water. If such an electrolyte solution is used, it is possible to increase the molar concentration of citrate ions and improve the service life of the oxygen sensor.

Chelating agents such as citric acid usually have chelating action and pH buffer capacity (the capacity to keep the pH of a solution substantially constant even if a small amount of acid or base is added). If acid or salt thereof that has chelating action in an aqueous solution is dissolved in water alone, the pH of the aqueous solution is mainly determined by the type and concentration of the chelating agent. Thus, the pH of an aqueous solution causes progression of galvanic corrosion against the material of the negative electrode depending on the type of chelating agent to be used, making it difficult to use an aqueous solution such as the electrolyte solution of a sensor in some cases.

Therefore, proposals have been made to use a mixed solution containing an acid serving as a chelating agent and a salt thereof in order to adjust the pH of an electrolyte solution in a suitable range while maintaining high pH buffer capacity. However, due to the studies conducted by the inventor of the present invention, it was found that if citric acid is used as a chelating agent, even if the total content of citric acid and salt thereof (i.e., citric acids) is increased and the pH of the electrolyte solution is adjusted in a suitable range, the service life is not always improved, and it is important that a specific amount of an alkali metal (it is inferred that most of the alkali metal is ionized to be present as alkali metal ions) are present in the electrolyte solution containing citric acid, by using a method for dissolving a salt of an alkali metal such as an alkali metal salt of an organic acid, preferably an alkali metal salt of citric acid, for example.

That is to say although the reasons therefor are not clear, it was found that when the total content of citric acids dissolved in the electrolyte solution is 2.1 mol/L or higher, the content of an alkali metal contained in the electrolyte solution is 0.1 to 1.6 times the total content of citric acids, and if the pH of the electrolyte solution is adjusted in a range of 3.9 to 4.6, it is possible to fully utilize the action of the citric acid (including ionized citric acid) as a chelating agent and to realize in an extension of the service life of the oxygen sensor.

In the present invention, the electrolyte solution having the above-described composition can be produced by dissolving, in water, which is a solvent, citric acids and an alkali metal salt, and for example, citric acid and an alkali metal salt of an organic acid, and preferably citric acid and an alkali metal salt of citric acid. It is possible to use tri-alkali metal citrates, di-alkali metal hydrogen citrate, and alkali metal dihydrogen citrate as the alkali metal salts of citric acid, and specific examples thereof can include lithium salts, sodium salts, potassium salts, rubidium salts, and cesium salts, and it is possible to preferably use trisodium citrate, tripotassium citrate, disodium hydrogen citrate, sodium dihydrogen citrate, dipotassium hydrogen citrate, and potassium dihydrogen citrate, and the like.

A mixed solution obtained by dissolving citric acid and tripotassium citrate in water at a ratio of 1.2 mol/L and 1.0 mol/L respectively results in an electrolyte solution in which the total content of dissolved citric acids is 2.2 mol/L, the content of an alkali metal (potassium) derived from tripotassium citrate is 1.0×3=3.0 mol/L, that is, the content of the alkali metal is 3.0/2.2=1.36 times the total content of citric acids, and the electrolyte solution having a pH of 4.23 at 25° C., for example.

An electrolyte solution having the above-described composition can also be produced using an alkali metal salt of an organic acid other than citric acid. Alkali metal salts (including acidic salts) of monocarboxylic acids and polycarboxylic acids such as acetic acid, formic acid, oxalic acid, succinic acid, fumaric acid, maleic acid, tartaric acid, glutaric acid, adipic acid, malic acid, malonic acid, aspartic acid, glutamic acid, and ascorbic acid can be used, and sodium acetate, potassium acetate, sodium hydrogen oxalate, potassium hydrogen oxalate, disodium oxalate, dipotassium oxalate, sodium hydrogen tartrate, potassium hydrogen tartrate, ammonium potassium tartrate, disodium tartrate, dipotassium tartrate, and the like can be preferably used, for example. Note that because the above-described polycarboxylic acids also act as chelating agents, it is expected that the concentration of tin in the electrolyte solution is delayed from reaching the saturation concentration by adding the polycarboxylic acid or a salt thereof and the service life of the oxygen sensor is improved.

A mixed solution obtained by dissolving citric acid and potassium acetate in water at a ratio of 2.5 mol/L and 1.0 mol/L respectively results in an electrolyte solution in which the total content of dissolved citric acids is 2.5 mol/L, the content of an alkali metal (potassium) derived from potassium acetate is 1.0 mol/L, that is, the content of the alkali metal is 1.0/2.5=0.4 times the total content of citric acids, for example.

Note that a pH adjusting agent can be added to the electrolyte solution in order to more appropriately adjust the pH of the mixed solution of citric acid and an alkali metal salt of an organic acid in the present invention. Examples of the pH adjusting agent include organic acids and salts thereof, inorganic acids and salts thereof, ammonia, and hydroxides. If the mixed solution is composed of the citric acid and potassium acetate, the pH thereof at 25° C. can be adjusted to 4.32 by adding ammonia at an amount of 3.0 mol/L.

Examples of the organic acids serving as pH adjusting agents include monocarboxylic acids and polycarboxylic acids such as acetic acid, formic acid, oxalic acid, succinic acid, fumaric acid, maleic acid, tartaric acid, glutaric acid, adipic acid, malic acid, malonic acid, aspartic acid, and glutamic acid, and ascorbic acid, and it is also possible to use, as salts of the organic acids, ammonium salts (including acidic salts) of the organic acids, such as ammonium acetate, diammonium tartrate, and ammonium hydrogen tartrate, and salts of citric acid other than alkali metal salts such as diammonium hydrogen citrate and triammonium citrate. Note that if the above-described salt of citric acid is added, the content thereof is added to the total content of citric acids.

Examples of the inorganic acid serving as a pH adjusting agent include hydrochloric acid, sulfuric acid, nitric acid, phosphoric acid, and carbonic acid, and examples of the salts of the inorganic acid include alkali metal salts and ammonium salts (including acidic salts) of the inorganic acids, such as ammonium chloride, sodium hydrogen sulfate, potassium hydrogen sulfate, ammonium sulfate, trisodium phosphate, tripotassium phosphate, disodium hydrogen phosphate, dipotassium hydrogen phosphate, sodium carbonate, potassium carbonate, sodium hydrogen carbonate, potassium hydrogen carbonate, ammonium carbonate, and ammonium hydrogen carbonate. Note that if an alkali metal salt of the inorganic acids is added, the alkali metal included in the compound is added as the "content of the alkali metals included in the electrolyte solution".

Note that because ammonia is volatile, in consideration of a change in the composition of the electrolyte solution due to volatilization, the total content of ammonia in the electrolyte solution derived from ammonia water and the ammonium salt is preferably set within a certain amount, and a mole ratio of the total content of ammonia to the total content of citric acids in the electrolyte solution is preferably set to 1.1 or lower, and is more preferably set to 0.5 or lower, and the electrolyte solution need not contain ammonia.

Examples of hydroxides serving as pH adjusting agents include hydroxides of alkali metals such as sodium hydroxide and potassium hydroxide. Note that if a hydroxide of the alkali metal is added, the alkali metal included in the compound is added as the "content of the alkali metal included in the electrolyte solution".

The electrolyte solution to be used in the present invention can be produced by selecting the types of citric acids and alkali metal salt and the ratio thereof as appropriate, and adding a pH adjusting agent as needed.

The electrolyte solution to be used in the present invention is adjusted such that the content of an alkali metal is 0.1 to 1.6 times the total content of citric acids, and the pH of the electrolyte solution is in a range of 3.9 to 4.6, and as the total content of citric acids increases, the chelating action of the electrolyte solution can be maintained for a longer period of time under the above-described conditions. Therefore, in order to extend the service life of the oxygen sensor, the total content of citric acids in the electrolyte solution is preferably set to 2.4 mol/L or higher, and is more preferably set to 2.7 mol/L or higher.

Also, although the reasons therefor are not clear, even if the total contents of citric acids or the pH values in the electrolyte solutions are the same, the higher the content of citric acid in an electrolyte solution is, the longer the chelating action of the electrolyte solution can be maintained, and thus the content of citric acid in the electrolyte solution is preferably 1.1 mol/L or higher, more preferably 1.7 mol/L or higher, and particularly preferably 2.0 mol/L or higher.

Similarly, although the reasons therefor are not clear, if the content of an alkali metal in the electrolyte solution is lower than 0.1 times the total content of citric acids or exceeds 1.6 times the total content of citric acids, the service life cannot be extended longer than a certain length of time. From the viewpoint of increasing the ion conductance of the electrolyte solution, the content of the alkali metal in the electrolyte solution is preferably set to 0.45 times the total content of citric acids. Note that if the content of the alkali metal in the electrolyte solution is lower than 0.1 times the total content of citric acids, it will be difficult to increase the ion conductance of the electrolyte solution in the above-described pH range, thereby making the operation of the oxygen sensor unstable in some cases.

Also, the oxygen sensor according to the present invention is configured such that the volume of the electrolyte solution to the mass of tin, which is a reactant of the negative electrode, is at a certain value or more in order to take advantage of the characteristics of the electrolyte solution. That is to say, the amount of the electrolyte solution is adjusted such that when the amount of the electrolyte solution in the oxygen sensor is x (ml) and the content of tin in the negative electrode is y (g), x/y is higher than or equal to 0.3 (ml/g). If x/y is less than 0.3 (ml/g), the pH of the electrolyte solution changes quickly when the oxygen sensor is used, and the characteristics of the electrolyte solution cannot be utilized, and the effect of improving the service life of the oxygen sensor becomes insufficient.

In order to suppress a change of the pH of the electrolyte solution when the oxygen sensor is used, the x/y value is preferably set to 0.7 (ml/g) or more, and is more preferably set to 1 (ml/g) or more. On the other hand, in order to reduce the volume of the electrolyte solution stored and reduce the volume of the oxygen sensor as much as possible, the x/y value is preferably set to 10 (ml/g) or less, is more preferably set to 6.5 (ml/g) or less, and is particularly preferably set to 3 (ml/g) or less.

Although Sn or an Sn alloy is used as the negative electrode of the oxygen sensor according to the present invention, it is preferable to use an Sn alloy in order to suppress a reaction with the electrolyte solution and prevent the generation of hydrogen. Examples of the Sn alloy include Sn—Ag alloys, Sn—Cu alloys, Sn—Ag—Cu alloys, and Sn—Sb alloys, and alloys containing metal elements such as Al, Bi, Fe, Mg, Na, Zn, Ca, Ge, In, Ni, Co, and the like can be used.

Also, although Sn or an Sn alloy can contain a certain amount of impurities, it is desired that the content of Pb is lower than 1000 ppm to comply with the RoHS Directive.

Specifically, it is possible to preferably use, as an Sn alloy, general lead-free solder materials (Sn-3.0Ag-0.5Cu, Sn-3.5Ag, Sn-3.5Ag-0.75Cu, Sn-3.8Ag-0.7Cu, Sn-3.9Ag-0.6Cu, Sn-4.0Ag-0.5Cu, Sn-1.0Ag-0.5Cu, Sn-1.0Ag-0.7Cu, Sn-0.3Ag-0.7Cu, Sn-0.75Cu, Sn-0.7Cu—Ni—P—Ge, Sn-0.6Cu—Ni—P—GeSn-1.0Ag-0.7Cu—Bi—In, Sn-0.3Ag-0.7Cu-0.5Bi—Ni, Sn-3.0Ag-3.0Bi-3.0In, Sn-3.9Ag-0.6Cu-3.0Sb, Sn-3.5Ag-0.5Bi-8.0In, Sn-5.0Sb, Sn-10Sb, Sn-0.5Ag-6.0Cu, Sn-5.0Cu-0.15Ni, Sn-0.5Ag-4.0Cu, Sn-2.3Ag—Ni—Co, Sn-2Ag-Cu—Ni, Sn-3Ag-3Bi-0.8Cu—Ni, Sn-3.0Ag-0.5Cu—Ni, Sn-0.3Ag-2.0Cu—Ni, Sn-0.3Ag-0.7Cu—Ni, Sn-58Bi, Sn-57Bi-1.0Ag, and the like), and Sn—Sb alloys.

As shown in FIG. 1, an electrode constituted by a catalytic electrode and a positive electrode current collector is used as the positive electrode of the oxygen sensor of the present invention, for example. Although the constituent material of the catalytic electrode is not particularly limited as long as a current is generated through electrochemical reduction of oxygen on the positive electrode, redox-active catalysts such as gold (Au), silver (Ag), platinum (Pt), and titanium (Ti) can be suitably used.

Also, a barrier membrane to control the entry of oxygen is preferably disposed on an outer surface of the positive electrode of the oxygen sensor so as not to allow an excess amount of oxygen to reach the catalytic electrode. Preferably, a barrier membrane selectively allows oxygen to pass therethrough and also can limit the amount of oxygen gas passing therethrough. The material and the thickness of the barrier membrane are not particularly limited, and a fluoropolymer such as polytetrafluoroethylene or a tetrafluoroethylene-hexafluoropropylene copolymer, a polyolefin such as polyethylene, or the like can be typically used. It is possible to use porous membranes, non-porous membranes, and further, membranes having holes provided with capillary tubes, which are called capillary-type membranes as a barrier membrane.

Furthermore, in order to protect the barrier membrane, it is preferable to dispose a protective film constituted by a porous resin film on the barrier membrane. The material and thickness of the protective film are not particularly limited as long as it has a function of preventing dirt, dust, water, or the like from adhering to the barrier membrane, and of allowing air (including oxygen) to pass therethrough, and a fluoropolymer such as polytetrafluoroethylene can be typically used.

The holder 20, which is an outer cover body of the oxygen sensor 1 shown in FIG. 1, can be composed of ABS resin, for example. Also, the holder lid 10 (the first holder lid 11 and the second holder lid 12) arranged on the opening portion in the holder 20 can be composed of ABS resin, polypropylene, polycarbonate, fluoropolymer, or the like, for example. Furthermore, the positive electrode current collector holding portion 70 for holding the positive electrode 50 in the holder 20 can be composed of ABS resin, for example.

Also, the O-ring 30 interposed between the holder 20 and the holder lid 10 (the first holder lid 11) is pressed and deformed by screwing the second holder lid 12 onto the holder 20, thereby allowing the airtightness and the liquid tightness of the oxygen sensor 1 to be maintained. The material of the O-ring is not particularly limited, and nitrile rubber, silicone rubber, ethylene-propylene rubber, a fluoropolymer, or the like is typically used.

Although the present invention has been described using, as an example, a galvanic cell type oxygen sensor, which is one embodiment of an oxygen sensor according to the present invention, the oxygen sensor of the present invention is not limited to the above-described embodiment, and various changes and modifications can be made within the scope of the technical idea of the invention. Also, with regard to the oxygen sensor shown in FIG. 1 as well, various changes and modifications in design can be made as long as functions as the oxygen sensor and the above-described oxygen supply pathways are provided.

Also, the oxygen sensor of the present invention can also take the form of a potentiostatic type oxygen sensor. The potentiostatic type oxygen sensor is a sensor configured such that a constant voltage is applied between a positive electrode and a negative electrode, and the voltage to be applied is set depending on the electrochemical characteristics of the respective electrodes and the type of gas to be detected. In the potentiostatic type oxygen sensor, a current that flows between the positive electrode and the negative electrode when an appropriate constant voltage is applied therebetween is proportional to the oxygen gas concentration. Thus, by converting the current to a voltage, it becomes possible to detect the oxygen gas concentration in unknown gas by measuring the voltage, as in the case of a galvanic cell type oxygen sensor.

EXAMPLES

Hereinafter, the present invention is described more specifically with reference to the examples. However, the following examples do not limit the present invention.

Example 1

Preparation of Electrolyte Solution

An electrolyte solution was prepared by dissolving citric acid and tripotassium citrate in water. Note that the molar concentration of citric acid was 1.2 mol/L, and the molar concentration of tripotassium citrate was 1.0 mol/L in the electrolyte solution. The total content of citric acids dissolved in the electrolyte solution was 2.2 mol/L, the content of an alkali metal (potassium) dissolved therein was 3.0 mol/L, which was 1.36 times the total content of citric acids, and the pH of the electrolyte solution was 4.23 at 25° C.

Assembly of Oxygen Sensor

A galvanic cell type oxygen sensor having the configuration shown in FIG. 1 was assembled using 4.3 mL of the above-described electrolyte solution. The holder lid 10 (the first holder lid 11 and the second holder lid 12), the holder 20, and the positive electrode current collector holding portion 70 were formed of ABS resin. Also, a porous polytetrafluoroethylene sheet was used as the protective film 40, and a tetrafluoroethylene-hexafluoropropylene copolymer membrane was used as the barrier membrane 60.

The catalytic electrode 51 of the positive electrode 50 was composed of gold, and the positive electrode current collector 52 and the lead wire 120 were made of titanium, and the positive electrode current collector 52 and the lead wire 120 were welded to each other to form a single body. Also, the negative electrode 100 was composed of 3.7 g of an Sn—Sb alloy (the Sb content was 5 mas %, and the mass of Sn was 3.52 g).

In the obtained oxygen sensor 1, the first holder lid 11, the O-ring 30, the protective film 40 constituted by the polytetrafluoroethylene sheet, the barrier membrane 60 formed of the tetrafluoroethylene-hexafluoropropylene copolymer membrane, the catalytic electrode 51, and the positive electrode current collector 52 were pressed against each other when the second holder lid 12 was screwed onto the holder 20, thereby they were kept in a favorable contact state. The first holder lid 11 functioned as a presser end plate, and the airtightness and the liquid tightness were secured by the O-ring 30. Also, the ratio between the amount (4.3 ml) of the electrolyte solution stored and the mass (3.52 g) of Sn contained in the negative electrode was 1.22 (ml/g).

Example 2

An electrolyte solution was prepared by dissolving citric acid, tripotassium citrate, and ammonia in water, and an oxygen sensor was assembled in the same manner as that of Example 1 except that the prepared electrolyte solution was used. Note that the molar concentration of citric acid was 2.5 mol/L, the molar concentration of tripotassium citrate was 0.5 mol/L, and the molar concentration of ammonia was 3.0 mol/L in the electrolyte solution. The total content of citric acids dissolved in the electrolyte solution was 3.0 mol/L, the content of an alkali metal (potassium) dissolved therein was 1.5 mol/L, which was 0.5 times the total content of citric acids, and the pH of the electrolyte solution was 4.30 at 25° C. Also, the mole ratio of the total content of ammonia to the total content of citric acids in the electrolyte solution was 1.

Example 3

An electrolyte solution was prepared by dissolving citric acid, potassium acetate, and ammonia in water, and an oxygen sensor was assembled in the same manner as that of Example 1 except that the prepared electrolyte solution was used. Note that the molar concentration of citric acid was 2.5 mol/L, the molar concentration of potassium acetate was 1.0 mol/L, and the molar concentration of ammonia was 3.0 mol/L in the electrolyte solution. The total content of citric acids dissolved in the electrolyte solution was 2.5 mol/L, the content of an alkali metal (potassium) dissolved therein was 1.0 mol/L, which was 0.4 times the total content of citric acids, and the pH of the electrolyte solution was 4.32 at 25° C. Also, the mole ratio of the total content of ammonia to the total content of citric acids in the electrolyte solution was 1.2.

Example 4

An electrolyte solution was prepared and an oxygen sensor was assembled in the same manner as that of Example 3 except that the molar concentration of potassium acetate was changed to 1.5 mol/L, and the molar concentration of ammonia was changed to 2.5 mol/L. The total content of citric acids dissolved in the electrolyte solution was 2.5 mol/L, the content of an alkali metal (potassium) dissolved therein was 1.5 mol/L, which was 0.6 times the total content of citric acids, and the pH of the electrolyte solution was 4.39 at 25° C. Also, the mole ratio of the total content of ammonia to the total content of citric acids in the electrolyte solution was 1.

Example 5

An electrolyte solution was prepared and an oxygen sensor was assembled in the same manner as that of Example 3 except that the molar concentration of citric acid was changed to 2.6 mol/L, and the molar concentration of ammonia was changed to 3.3 mol/L. The total content of citric acids dissolved in the electrolyte solution was 2.6 mol/L, the content of an alkali metal (potassium) dissolved therein was 1.0 mol/L, which was 0.38 times the total content of citric acids, and the pH of the electrolyte solution was 4.36 at 25° C. Also, the mole ratio of the total content of ammonia to the total content of citric acids in the electrolyte solution was 1.27.

Comparative Example 1

An electrolyte solution was prepared and an oxygen sensor was assembled in the same manner as that of Example 1 except that the molar concentration of citric acid was changed to 1.0 mol/L, and the molar concentration of tripotassium citrate was changed to 1.2 mol/L. The total content of citric acids dissolved in the electrolyte solution was 2.2 mol/L, the content of an alkali metal (potassium) dissolved therein was 3.6 mol/L, which was 1.64 times the total content of citric acids, and the pH of the electrolyte solution was 4.55 at 25° C.

Comparative Example 2

An electrolyte solution was prepared and an oxygen sensor was assembled in the same manner as that of Example 1 except that the molar concentration of citric acid was changed to 1.4 mol/L, and the molar concentration of tripotassium citrate was changed to 0.8 mol/L. The total content of citric acids dissolved in the electrolyte solution was 2.2 mol/L, the content of an alkali metal (potassium) dissolved therein was 2.4 mol/L, which was 1.09 times the total content of citric acids, and the pH of the electrolyte solution was 3.60 at 25° C.

Comparative Example 3

An electrolyte solution was prepared and an oxygen sensor was assembled in the same manner as that of Example 1 except that the molar concentration of citric acid was changed to 1.6 mol/L, and the molar concentration of tripotassium citrate was changed to 0.6 mol/L. The total content of citric acids dissolved in the electrolyte solution was 2.2 mol/L, the content of an alkali metal (potassium) dissolved therein was 1.8 mol/L, which was 0.82 times the total content of citric acids, and the pH of the electrolyte solution was 3.34 at 25° C.

Comparative Example 4

An electrolyte solution was prepared and an oxygen sensor was assembled in the same manner as that of Example 1 except that the molar concentration of citric acid was changed to 1.72 mol/L, and the molar concentration of tripotassium citrate was changed to 0.5 mol/L. The total content of citric acids dissolved in the electrolyte solution was 2.22 mol/L, the content of an alkali metal (potassium) dissolved therein was 1.5 mol/L, which was 0.68 times the total content of citric acids, and the pH of the electrolyte solution was 3.07 at 25° C.

Comparative Example 5

An electrolyte solution was prepared and an oxygen sensor was assembled in the same manner as that of Example 1 except that the molar concentration of citric acid was changed to 0.26 mol/L, and the molar concentration of tripotassium citrate was changed to 2.0 mol/L. The total content of citric acids dissolved in the electrolyte solution was 2.26 mol/L, the content of an alkali metal (potassium) dissolved therein was 6.0 mol/L, which was 2.65 times the total content of citric acids, and the pH of the electrolyte solution was 6.37 at 25° C.

Comparative Example 6

An electrolyte solution was prepared and an oxygen sensor was assembled in the same manner as that of Example 1 except that the molar concentration of citric acid was changed to 0.6 mol/L, and the molar concentration of tripotassium citrate was changed to 0.8 mol/L. The total content of citric acids dissolved in the electrolyte solution was 1.4 mol/L, the content of an alkali metal (potassium) dissolved therein was 2.4 mol/L, which was 1.71 times the total content of citric acids, and the pH of the electrolyte solution was 4.48 at 25° C.

Comparative Example 7

An electrolyte solution was prepared and an oxygen sensor was assembled in the same manner as that of Example 1 except that the molar concentration of citric acid was changed to 1.0 mol/L, and the molar concentration of tripotassium citrate was changed to 0 mol/L. The total content of citric acids dissolved in the electrolyte solution was 1.0 mol/L, and the electrolyte solution contained no alkali metals, and the pH of the electrolyte solution was 1.50 at 25° C.

Comparative Example 8

An electrolyte solution was prepared by dissolving citric acid and potassium carbonate in water, and an oxygen sensor was assembled in the same manner as that of Example 1 except that the prepared electrolyte solution was used. Note that the molar concentration of citric acid was 2.5 mol/L, and the molar concentration of potassium carbonate was 2.0 mol/L in the electrolyte solution. The total content of citric acids dissolved in the electrolyte solution was 2.5 mol/L, the content of an alkali metal (potassium) dissolved therein was 4.0 mol/L, which was 1.6 times the total content of citric acids, and the pH of the electrolyte solution was 4.86 at 25° C.

Comparative Example 9

An oxygen sensor was assembled in the same manner as that of Example 1 except that the amount of the electrolyte solution was 1 ml. Note that the ratio between the amount of the electrolyte solution stored and the mass of Sn contained in the negative electrode was 0.28 (ml/g).

Table 1 shows the compositions and physical properties of the electrolyte solutions used in the oxygen sensors of the examples and the comparative examples.

TABLE 1

| | Content (mol/L) | | | | | Total Content of Citric Acids (mol/L) | Content Ratio between Alkali Metal and Citric Acids | pH of Electrolyte Solution (25° C.) |
|---|---|---|---|---|---|---|---|---|
| | Citric Acid | Tripotassium Citrate | Potassium Acetate | Potassium Carbonate | Ammonia | | | |
| Ex. 1 | 1.2 | 1.0 | — | — | — | 2.2 | 1.36 | 4.23 |
| Ex. 2 | 2.5 | 0.5 | — | — | 3.0 | 3.0 | 0.5 | 4.30 |
| Ex. 3 | 2.5 | — | 1.0 | — | 3.0 | 2.5 | 0.4 | 4.32 |
| Ex. 4 | 2.5 | — | 1.5 | — | 2.5 | 2.5 | 0.6 | 4.39 |
| Ex. 5 | 2.6 | — | 1.0 | — | 3.3 | 2.6 | 0.38 | 4.36 |
| Comp. Ex. 1 | 1.0 | 1.2 | — | — | — | 2.2 | 1.64 | 4.55 |
| Comp. Ex. 2 | 1.4 | 0.8 | — | — | — | 2.2 | 1.09 | 3.60 |
| Comp. Ex. 3 | 1.6 | 0.6 | — | — | — | 2.2 | 0.82 | 3.34 |
| Comp. Ex. 4 | 1.72 | 0.5 | — | — | — | 2.22 | 0.68 | 3.07 |
| Comp. Ex. 5 | 0.26 | 2.0 | — | — | — | 2.26 | 2.65 | 6.37 |
| Comp. Ex. 6 | 0.6 | 0.8 | — | — | — | 1.4 | 1.71 | 4.48 |
| Comp. Ex. 7 | 1.0 | — | — | — | — | 1.0 | 0 | 1.50 |
| Comp. Ex. 8 | 2.5 | — | — | 2.0 | — | 2.5 | 1.6 | 4.86 |

Example 1 except that the molar concentration of citric acid was changed to 0.6 mol/L, and the molar concentration of tripotassium citrate was changed to 0.8 mol/L. The total content of citric acids dissolved in the electrolyte solution Accelerated life testing was performed by passing oxygen gas at a concentration of 100% through each of the oxygen sensors of the examples and the comparative examples at a temperature of 40° C. Electrochemical reactions at 40° C.

proceed about twice as fast as those at room temperature. Also, electrochemical reactions when oxygen gas at a concentration of 100% is passed through the oxygen sensor proceed about 5 times as fast as those in the air. Accordingly, when oxygen gas at a concentration of 100% is passed through an oxygen sensor at a temperature of 40° C., this accelerated life testing can determine the service lives of the oxygen sensors about 10 times faster than in the case where they are left at room temperature in the air. In this testing, the voltages output by the oxygen sensors were measured, a point of time when the output voltage decreased to 90% of the voltage output when measurement was started was regarded as the service lives thereof and the performance of the oxygen sensors was evaluated by the period of time until the service life ended (measurable time period). Table 2 shows the results of measurement made when the measurable time period of the oxygen sensor of Comparative Example 1 was 100.

TABLE 2

|  | Service Life |
| --- | --- |
| Ex. 1 | 187 |
| Ex. 2 | 260 |
| Ex. 3 | 204 |
| Ex. 4 | 178 |
| Ex. 5 | 196 |
| Comp. Ex. 1 | 100 |
| Comp. Ex. 2 | 131 |
| Comp. Ex. 3 | 95 |
| Comp. Ex. 4 | 55 |
| Comp. Ex. 5 | 103 |
| Comp. Ex. 6 | 21 |
| Comp. Ex. 7 | 121 |
| Comp. Ex. 8 | 54 |

As shown in Tables 1 and 2, the oxygen sensors of Examples 1 to 5 exerted high performance for a long period of time and had a long service life, the oxygen sensors each having an electrolyte solution that had an appropriate total content of citric acids, an appropriate content ratio between the alkali metal and citric acids, and an appropriate pH value, and the oxygen sensors each having an appropriate ratio between the volume of the electrolyte solution and the content of tin contained in a negative electrode.

In contrast, the oxygen sensors of Comparative Examples 1 to 4 and 8 in which the content ratio between the alkali metal and the citric acids in the electrolyte solutions or the pH of the electrolyte solutions are outside the scope of the present invention, and the oxygen sensor of Comparative Example 5 in which the content ratio therebetween and the pH of the electrolyte solution are outside the scope of the present invention maintained good performance for a shorter period of time than the oxygen sensors of the examples did, and had a shorter service life than the oxygen sensors of the examples. Furthermore, the oxygen sensor of Comparative Example 6 had a shorter service life than the oxygen sensor of Comparative Example 1 because the total content of citric acids was lower than 2.1 mol/L even though the content ratio between the alkali metal and the citric acids in the electrolyte solution and the pH of the electrolyte solution were substantially the same as those of the oxygen sensor of Comparative Example 1. Also, the operation of the oxygen sensor of Comparative Example 7 was unstable because the electrolyte solution did not contain alkali metals, and the pH of the electrolyte solution and the total content of citric acids were outside the scope of the present invention, and thus the service life of the oxygen sensor of Comparative Example 7 was significantly shorter than that of the oxygen sensor of Comparative Example 1 that had the same amount of citric acid.

Furthermore, the oxygen sensor of Comparative Example 9 in which the ratio of the amount of the electrolyte solution to the content of tin contained in the negative electrode was lower than 0.3 ml/g had a shorter service life because the characteristics of the electrolyte solution were not able to be utilized due to the pH of the electrolyte solution changing quickly; and the dissolved tin reaching the saturation concentration in a short period of time.

The invention can be embodied in other forms without departing from the spirit thereof. The embodiments disclosed in this application are examples, and the present invention is not limited to these embodiments. The scope of the invention is indicated by the appended claims rather than by the foregoing description, and all changes that come within the meaning and range of equivalency of the claims are intended to be embraced therein.

INDUSTRIAL APPLICABILITY

An electrochemical oxygen sensor according to the present invention is applicable to the same applications as conventionally known electrochemical oxygen sensors.

DESCRIPTION OF REFERENCE NUMERALS

1 Electrochemical oxygen sensor
10 Holder lid
11 First holder lid (inner lid)
12 Second holder lid (outer lid)
20 Holder
30 O-ring
40 Protective film
50 Positive electrode
51 Catalytic electrode
52 Positive electrode current collector
60 Barrier membrane
70 Positive electrode current collector holding portion
80 Bore for supplying electrolyte solution
90 Bore for lead wire
100 Negative electrode
110 Electrolyte solution
120 Lead wire
130 Correction resistor
140 Temperature compensation thermistor
150 Through-hole

The invention claimed is:
1. An electrochemical oxygen sensor comprising:
a positive electrode;
a negative electrode comprising tin or a tin alloy; and
an aqueous electrolyte solution comprising at least one selected from the group consisting of citric acids,
wherein the aqueous electrolyte solution contains an alkali metal,
wherein a total content of the citric acids in the aqueous electrolyte solution is 2.1 mol/L or higher,
wherein a content of the alkali metal in the aqueous electrolyte solution is 0.1 to 1.6 times the total content of the citric acids,
wherein the aqueous electrolyte solution has a pH of 3.9 to 4.6, and
wherein the ratio of a volume of the aqueous electrolyte solution: x (ml) to a content of tin contained in the negative electrode: y (g) (x/y) is 0.3 (ml/g) or more.

2. The electrochemical oxygen sensor according to claim 1,
wherein the aqueous electrolyte solution comprises an alkali metal salt of an organic acid.

3. The electrochemical oxygen sensor according to claim 1,
wherein the aqueous electrolyte solution comprises an alkali metal salt of citric acid as the citric acids.

4. The electrochemical oxygen sensor according to claim 1,
wherein the aqueous electrolyte solution comprises an alkali metal salt of acetic acid.

5. The electrochemical oxygen sensor according to-claim 1,
wherein the aqueous electrolyte solution comprises citric acid as the citric acids.

6. The electrochemical oxygen sensor according to claim 5,
wherein a content of citric acid in the aqueous electrolyte solution is 1.1 mol/L or higher.

7. The electrochemical oxygen sensor according to claim 1,
wherein the aqueous electrolyte solution comprises ammonia or an ammonium salt of organic acid or inorganic acid.

8. The electrochemical oxygen sensor according to claim 7,
wherein a mole ratio of a total content of ammonia to the total content of the citric acids in the aqueous electrolyte solution is 1.1 or lower.

9. The electrochemical oxygen sensor according to claim 1, wherein the ratio x/y is 10 (ml/g) or less.

10. The electrochemical oxygen sensor according to claim 1,
wherein the positive electrode contains Au, Ag, Pt, or Ti as a catalyst.

11. The electrochemical oxygen sensor according to claim 1, wherein the citric acids comprise citric acid and a salt of citric acid.

12. The electrochemical oxygen sensor according to claim 1, wherein the aqueous electrolyte solution comprises said at least one selected from the group consisting of citric acid and a salt of citric acid.

* * * * *